US012267936B2

(12) United States Patent
Gill

(10) Patent No.: US 12,267,936 B2
(45) Date of Patent: Apr. 1, 2025

(54) INDUCTION HEATING ASSEMBLY FOR A VAPOUR GENERATING DEVICE

(71) Applicant: JT International SA, Geneva (CH)

(72) Inventor: Mark Gill, London (GB)

(73) Assignee: JT International SA (CH)

( * ) Notice: Subject to any disclaimer, the term of this patent is extended or adjusted under 35 U.S.C. 154(b) by 129 days.

(21) Appl. No.: 18/165,685

(22) Filed: Feb. 7, 2023

(65) Prior Publication Data

US 2023/0262849 A1 Aug. 17, 2023

Related U.S. Application Data

(63) Continuation of application No. 16/956,876, filed as application No. PCT/EP2018/097073 on Dec. 28, 2018, now Pat. No. 11,582,839.

(30) Foreign Application Priority Data

Dec. 29, 2017 (EP) .................................... 17211203
Dec. 22, 2018 (TW) ................................ 107146588

(51) Int. Cl.
*A24F 13/00* (2006.01)
*A24F 40/42* (2020.01)
(Continued)

(52) U.S. Cl.
CPC ............ *H05B 6/108* (2013.01); *A24F 40/42* (2020.01); *A24F 40/465* (2020.01);
(Continued)

(58) Field of Classification Search
CPC ...................................................... A24F 47/00
(Continued)

(56) References Cited

U.S. PATENT DOCUMENTS 10,219,543 B2 * 3/2019 Gill ......................... A24F 40/60
11,852,839 B2 * 12/2023 Evans .................. G02F 1/0136
(Continued)

FOREIGN PATENT DOCUMENTS

GB 2527597 A 12/2015
JP 2017526381 A 9/2017
(Continued)

OTHER PUBLICATIONS

Beguš, S. et al., "Magnetic effects on thermocouples". Measurement Science and Technology. vol. 25. 035006. (Jan. 2014)10.1088/0957-0233/25/3/035006. 13 pgs.
(Continued)

*Primary Examiner* — Phuong K Dinh
(74) *Attorney, Agent, or Firm* — Lerner David LLP

(57) ABSTRACT

An induction heating assembly for a vapour generating device includes an induction coil, radially inward of which a heating compartment is defined for receiving, in use, a body including a vaporisable substance and an induction heatable susceptor; and a temperature sensor located against a side of the heating compartment on the central longitudinal axis of the induction coil at an end of the heating compartment, wherein the induction coil is arranged to heat, in use, the susceptor, and the temperature sensor is arrange to monitor, in use, a temperature related to heat generated from the susceptor. There is also provided an induction heatable cartridge for use with the induction heating assembly. The cartridge includes a solid vaporisable substance; and an induction heatable susceptor held by the vaporisable substance, the susceptor being planar and having an outwardly facing edge and an inwardly facing edge.

17 Claims, 8 Drawing Sheets

(51) Int. Cl.

| | |
|---|---|
| ***A24F 40/465*** | (2020.01) |
| ***A24F 40/485*** | (2020.01) |
| ***A24F 40/51*** | (2020.01) |
| ***A24F 40/53*** | (2020.01) |
| ***A24F 40/57*** | (2020.01) |
| ***H05B 6/10*** | (2006.01) |
| ***H05B 6/36*** | (2006.01) |
| *A24F 40/20* | (2020.01) |

(52) U.S. Cl.
CPC ............ *A24F 40/485* (2020.01); *A24F 40/51* (2020.01); *A24F 40/53* (2020.01); *A24F 40/57* (2020.01); *H05B 6/105* (2013.01); *H05B 6/36* (2013.01); *A24F 40/20* (2020.01)

(58) Field of Classification Search
USPC .................................................. 131/328–329
See application file for complete search history.

(56) References Cited

U.S. PATENT DOCUMENTS

| | | | |
|---|---|---|---|
| 2017/0055574 | A1 | 3/2017 | Kaufman et al. |
| 2017/0055584 | A1 | 3/2017 | Blandino et al. |
| 2017/0119048 | A1 | 5/2017 | Kaufman et al. |
| 2017/0119049 | A1 | 5/2017 | Blandino et al. |
| 2017/0119059 | A1 | 5/2017 | Zuber et al. |
| 2021/0059309 | A1 | 3/2021 | Gill |

FOREIGN PATENT DOCUMENTS

| | | | |
|---|---|---|---|
| JP | 2021510500 | A | 4/2021 |
| WO | 2016075436 | A1 | 5/2016 |
| WO | 2017001819 | A1 | 1/2017 |
| WO | 2019/068664 | A1 | 4/2019 |

OTHER PUBLICATIONS

International Search Report including the Written Opinion from Application No. PCT/EP2018/097073 mailed Mar. 29, 2019, 15 pages.

* cited by examiner

INDUCTION HEATING ASSEMBLY FOR A VAPOUR GENERATING DEVICE

CROSS-REFERENCE TO RELATED APPLICATIONS

The present application is a continuation of U.S. patent application Ser. No. 16/956,876, filed on Jun. 22, 2020, which is a national phase entry under 35 U.S.C. § 371 of International Application No. PCT/EP2018/097073, filed Dec. 28, 2018, published in English, which claims priority to European Application No. 17211203.9 filed Dec. 29, 2017 and to Taiwanese Application No. 107146588 filed Dec. 22, 2018, all of the disclosures of which are incorporated herein by reference.

BACKGROUND

The present invention relates to an induction heating assembly for a vapour generating device.

Devices which heat, rather than burn, a substance to produce a vapour for inhalation have become popular with consumers in recent years.

Such devices can use one of a number of different approaches to provide heat to the substance. One such approach is that of simple provision of a heating element to which electrical power is provided to heat the element, the element in turn heating the substance to generate vapour.

One way to achieve such vapour generation is to provide a vapour generating device which employs an inductive heating approach. In such a device an induction coil (hereinafter also referred to as an inductor and induction heating device) is provided with the device and a susceptor is provided with the vapour generation substance. Electrical energy is provided to the inductor when a user activates the device which in turn creates an electromagnetic (EM) field. The susceptor couples with the field and generates heat which is transferred to the substance and vapour is created as the substance is heated.

Using induction heating to generate vapour has the potential to provide controlled heating and therefore controlled vapour generation. However, in practice such an approach can result in unsuitable temperatures unknowingly being produced in the vapour generation substance. This can waste power making it expensive to operate and risks damaging components or making ineffective use of the vapour generation substance inconveniencing users who expect a simple and reliable device.

This has been previously addressed by monitoring temperatures in a device. However, these temperatures have been found to be unreliable and not representative of the temperatures actually produced further reducing the reliability of such a device.

The present invention seeks to overcome at least some of the above problems.

SUMMARY OF INVENTION

According to a first aspect, there is provided an induction heating assembly for a vapour generating device, the heating assembly comprising: an induction coil, radially inward of which a heating compartment is defined for receiving, in use, a body comprising a vaporisable substance and an induction heatable susceptor; and a temperature sensor located against a side of the heating compartment on the central longitudinal axis of the induction coil at an end of the heating compartment, wherein the induction coil is arranged to heat, in use, the susceptor, and the temperature sensor is arrange to monitor, in use, a temperature related to heat generated from the susceptor.

(Note that the term side of the heating compartment is here used to include the axial ends of the heating compartment).

We have found that by locating the induction coil in this position, a suitable balance is achieved between the ability to accurately measure temperature and reducing noise caused by the EM field generated by the induction coil in the signal produced by the temperature sensor. Accordingly, this provides an improved accuracy in the monitored temperature whilst also allowing improved precision in the monitored temperature and therefore an optimal position for locating the temperature sensor. Separating the temperature sensor from where the heat is produced and having a gap between the sensor and the source of the EM filed would reduce the noise in the signal produced by the temperature sensor, which would allow the precision of the monitored temperature to improve. However, this reduces the accuracy of any monitored temperature because the temperature sensor is further from the location where the heat is produced. On the other hand, by locating the temperature sensor at the axial centre of the induction coil, the amount of noise is increased due to greater EM field strength at that position. This thereby reduces the precision able to be achieved, even though the monitored temperature has a greater likelihood of being representative of the temperature achieved by the heating.

By the phrase "located against a side of" in relation to the heating compartment as set out above, it is intended to mean that the temperature sensor is positioned at the side of the heating compartment. For example, it is intended for this phrase to mean that all parts of the temperature sensor may be closer to the side of the heating compartment than the middle of the heating compartment or a plane parallel to the side of the heating compartment passing through the middle of the heating compartment.

The susceptor may comprise one or more, but not limited, of aluminium, iron, nickel, stainless steel and alloys thereof, e.g. nickel chromium. With the application of an electromagnetic field in its vicinity, the susceptor may generate heat due to eddy currents and magnetic hysteresis losses resulting in a conversion of energy from electromagnetic to heat.

The induction coil may have any shape capable of providing heat in use to the susceptor. Typically, the induction coil has a cylindrical shape. This provides an EM field with improved in field uniformity radially inward of the coil over fields producible with other coil shapes. This thereby provides more even heating allowing temperature monitoring to be more representative of the temperature of body. This also enhances coupling of the EM field to the susceptor making heating more efficient.

Preferably, the temperature sensor may be positioned, preferably only, between an axial centre of the induction coil and an axial end of the induction coil. This locates the temperature sensor within the region in which effectively heat is produced due to great coupling of the susceptor with the EM field. Also the EM field strength is lower than at the axial centre of the induction coil. This allows the monitored temperature to be more representative of the temperatures produced by the heating due to the lesser EM field interference and therefore more accurate. Also preferably, the axial end of the induction coil may be the closest axial end to the side of the heating compartment against which the temperature sensor is located.

The temperature sensor may also be positioned, preferably only, at an axial end of the induction coil, or approximately at an axial end of the induction coil, such as any point removed from the axial end of the induction coil by up to the distance of a quarter of the length of the induction coil either towards the centre of the induction coil or away from the centre of the induction coil. Providing the sensor at a point beyond the axial end of the induction coil further reduces the amount of noise in the signal produced by the temperature sensor because there is less interaction between the temperature sensor and the EM field as the distance from the axial centre of the induction coil increases.

Additionally or alternatively, the temperature sensor may be located within the heating compartment or projected toward an inside of the heating compartment. This locates the temperature sensor within the region in which the body is located allowing the body to surround the temperature sensor when located in the heating compartment. This allows the temperature sensor to provide more representative monitored temperature since it is located in the environment in which the heat is generated and surrounded by the substance to which the heat is passed during the heating.

The cross sectional area of the temperature sensor perpendicular to the axial direction of the coil may be less than 10.0 square millimetres ($mm^2$), preferably less than 7.0 $mm^2$, more preferably less than 2.5 $mm^2$. This allows the temperature sensor receive less exposure to the EM field and therefore to reduce noise.

The assembly may be arranged to operate in use with a fluctuating electromagnetic field having a magnetic flux density of between approximately 0.5T and approximately 2.0T at the point of highest concentration.

The power source and circuitry may be configured to operate at a high frequency. Preferably, the power source and circuitry may be configured to operate at a frequency of between approximately 80 KHz and 500 kHz, preferably approximately 150 kHz and 250 kHz, more preferably approximately 200 kHz Whilst the induction coil may comprise any suitable material, typically the induction coil may comprise a Litz wire or a Litz cable.

According to a second aspect of the invention, there is provided an induction heatable cartridge for use with an induction heating assembly according to any one of the preceding claims, the cartridge comprising: a solid vaporisable substance; and an induction heatable susceptor held by the vaporisable substance, the susceptor being planar and having edges around the perimeter of the susceptor, wherein the total length of edge of the susceptor in a central region of the cartridge with a first area is greater than the total length of edge of the susceptor in any of a plurality of outer regions of the cartridge, each of the plurality of outer regions having the same shape and orientation as the central region and with an area equal to the first area, wherein the outer regions may extend radially beyond the outer perimeter of the cartridge preferably the central region and plurality of outer regions forming a continuous array, the outer perimeter of the array encompassing the outer perimeter of the cartridge.

When heat is being generated in the susceptor, most heat is generated at edges of the susceptor. By having a solid vaporisable substance, the susceptor is held in place within the cartridge. This allows the distribution of heat to be predictable and repeatable during heating since the edges do not move, as may be the case if the vaporisable substance were a liquid since this would be depleted by heating. The cartridge of the second aspect combines having a greater total length of inwardly facing edge than outwardly facing edge to allow heating to be concentrated at the centre of the cartridge causing the centre of the cartridge to be heated evenly. This allows any temperature monitoring using the induction heating assembly according to the first aspect to be more accurate because concentrating heating in this region means heat is produced at a minimal distance from the temperature sensor.

By "inwardly facing edge" we intend to mean that the edge is generally facing towards a centre of the susceptor. This usually means that an inwardly facing edge does not form part of the outer periphery of the susceptor. When the susceptor is located in the heating compartment (within a cartridge), the inwardly facing edges are intended to be the edges facing away from the closest part of the induction coil. Typically, such inner edges may surround an aperture within the centre of a planar ring-shaped susceptor element.

We intend an "outwardly facing edge" to be the opposite of an inwardly facing edge. By this we intend to mean that an outwardly facing edge is generally facing away from a centre of the susceptor. This usually means that an outwardly facing edge forms part of the outer periphery of the susceptor. When located in the heating compartment the outwardly facing edges are intended to be the edges facing towards the closest part of the induction coil.

A total length of edge within a unit area can be referred to as an edge density. Accordingly, it is intended that there is a higher edge density of inwardly facing edges of the susceptor in the central region than outwardly facing edges of the susceptor in the outer region.

The array referred to in relation to the second aspect may be a planar array. The array may be parallel to the susceptor, or susceptor plates.

By the term "encompassing", it is intended to mean that the area of the array is at least as large as, and overlaps with, the area of the cartridge. Put another way, this term is intended to mean that the minimum distance across the array is at least equal to the minimum distance across the cartridge at the widest point of the cartridge. Of course, the widest point is intended to be the widest point in a plane parallel to the plane of the array and/or susceptor/susceptor plates By the phrase "outer perimeter of the cartridge", we intend to mean the perimeter of the cartridge at the largest portion of the cartridge in a plane parallel to the plane of the array and susceptor/susceptor plates.

The susceptor may be any shape that provides inwardly facing edges and outwardly facing edges as set out above. Typically, the susceptor has an aperture in the central region. This allows more heat to be generated at the centre of the susceptor further improving the accuracy of the monitored temperature because the heat has less distance over which to dissipate before the temperature sensor detects the heat.

The first area may be less than the total area of the susceptor (or an individual susceptor plate). Further, the mid-point of the susceptor (or individual susceptor plate) may be outside of each outer region.

The central and outer regions may form elements in an array or regular grid defined within an area encompassing a cross-section of the cartridge in a plane parallel to the susceptor or an individual susceptor plate. In particular, the central and outer regions may comprise a 3 by 3 array of rectangles (with coincident sides and wherein the rectangles may be squares), the central one of which forms the central region and the other surrounding 8 regions forming the outer regions, and wherein the outer boundary of the array is selected to be as small as possible so as to completely bound the outer circumference of the cartridge. Alternatively, the outer boundary of the array may be selected to be as small as possible so as to completely bound the outer circumference of the smallest circle which bounds the cross-section of the cartridge (e.g. by connecting the apexes of a regular polygon).

In the case where the cross-section is substantially circular, the central and outer regions may be determined as follows: a square is defined by four lines, each of which is a tangential line to the circular cross-section of the cartridge. The area inside the square is separated into three even parts by two further lines, which are parallel two of the sides of the square. The area inside the square is also separated into three even parts by two further lines parallel to the other two sides of the square. This causes nine equally sized and shaped portions of the square to be formed. The area which is surrounded by the four further lines is the central region. Each other portion is an outer region.

In the case where the cross-section is a substantially regular polygon, the central and outer regions may be determined as follows: a circle is defined that connects the apexes on the regular polygon cross-section of the cartridge. A square is defined by four lines, each of which is a tangential line to said circle. The area inside the square is separated into three even parts by two further lines, which are parallel two of the sides of the square. The area inside the square is also separated into three even parts by two further lines parallel to the other two sides of the square. This causes nine equally sized and shaped portions of the square to be formed. The area which is surrounded by the four further lines is the central region. Each other portion is an outer region.

In the case where the cross-section is substantially oval, the central region and outer regions may be determined as follows: a rectangle is defined by four lines, each of which is a tangential line to the oval cross-section of the cartridge. Two of the tangential lines are parallel to the longest straight line that crosses the mid-point of the oval, and the other two tangential lines are parallel to the shortest straight line that crosses the mid-point of the oval (and which is perpendicular to said longest straight line). The area inside the rectangle is separated into three even parts between the two lines parallel to the longest straight line by two further lines parallel to the longest straight line. The area inside the rectangle is also separated into three even parts between the two lines parallel to the shortest straight line by two further lines parallel to the shortest straight line. This causes nine equally sized and shaped portions of the rectangle to be formed. The area which is surrounded by the two further lines parallel to the longest straight line and the two further lines parallel to the shortest straight line is the central region. Each other portion is an outer region.

Each of the central region and outer regions may have any total length of edge within them. Typically, the central region has a total length of combined edge greater than a total length of a combined edge in any of the outer regions (or at least greater than the average total length of combined edge portions in all of the outer regions), the combined edge (or combined edge portions) comprising inwardly facing edge portions and outwardly facing edge portions. This is advantageous because more heat is generated in the central region. This causes more heat to be generated close to the temperature sensor during heating when in use. This allows the monitored temperature to be more representative of the temperature achieved by heating, and therefore more accurate.

The susceptor may take any form suitable for heating the vaporisable substance. Typically, the susceptor comprises a plurality of plates, the plates being arranged in parallel planes perpendicular to the main central axis of the inductor coil. This improves distribution of the heat generated at the susceptor edges by having the susceptor components in multiple locations in the vaporisable substance.

The plates of the susceptor (referred to interchangeably as plates and susceptor plates) may be arranged in any manner suitable for heating the vaporisable substance. In some embodiments, each plate may take the form of a part of a disc or ring or similar shape, each being located with a radial separation between the plate and a mid-point of the central region. This provides good coupling between the susceptor plates and the EM field whilst minimising coupling of the EM field at a mid-point of the central region. This reduces the amount of energy that is absorbed at the mid-point of the central region by increasing the amount of energy absorbed at a distance from the mid-point, which minimises noise at the mid-point thereby reducing noise at the temperature sensor. This is because the temperature sensor and the mid-point are aligned along the central longitudinal axis of the heating compartment of the first aspect. By reducing the amount of energy absorbed at the mid-point, as well as along the central longitudinal axis of the induction coil (which is also achieved), the amount of inductive heating of the temperature sensor is also minimised.

Additionally, the plates may be orientated in any manner with a separation between each plate and the mid-point of the central region. Typically, the plates are orientated within the planes in which they are located to completely encircle the mid-point of the central region. This provides a higher density of inwardly facing edges in a central region than outwardly facing edges in outer regions while distributing the inwardly facing edges over a plurality of planes. This improves heat distribution by spreading the parts of the susceptor plates that generate most heat.

By the term "encircle" we intend to mean that the plates surround the mid-point in at least two dimensions so that for plane that combines all of the susceptor plates (even though they may be at different levels within the cartridge such as is shown in FIGS. 7 and 8), the mid-point is surrounded in that plane.

Preferably, each plane may include one plate or two plates, wherein for planes including one plate, there may be a further plane including a plate located on an opposing side of the mid-point of the central region, for planes including two plates there may be a separation between the respective plates with the respective plates being located on opposing sides of the mid-point of the central region from each other. We have found that these arrangements of the susceptor plates provides a high edge density of inwardly facing edges in the central region distributed through the vaporisable material. This therefore provides improved distribution of heat when heat is being generated.

The plates in respective planes may be orientated in any suitable manner relative to each other for distributing heat evenly though the vaporisable material. Typically, in each plane including two plates the plates in the respective plane have a different orientation to the plates in each other plane including two plates, preferably each plane including two plates. This provides more even heat distribution though the vaporisable material reducing the likelihood of any hot spots or cold spots.

The vaporisable substance may include any constituent suitable for generating vapour to be inhaled by a user. Typically, the vaporisable substance includes tobacco, humectant, glycerine and/or propylene glycol.

The vaporisable substance may be any type of solid or semi-solid material. Example types of vapour generating solids include powder, granules, pellets, shreds, strands, porous material or sheets. The substance may comprise plant derived material and in particular, the substance may comprise tobacco.

Preferably, the vaporisable substance may comprise an aerosol-former. Examples of aerosol-formers include polyhyrdric alcohols and mixtures thereof such as glycerine or propylene glycol. Typically, the vaporisable substance may comprise an aerosol-former content of between approximately 5% and approximately 50% on a dry weight basis. Preferably, the vaporisable substance may comprise an aerosol-former content of approximately 15% on a dry weight basis.

Upon heating, the vaporisable substance may release volatile compounds. The volatile compounds may include nicotine or flavour compounds such as tobacco flavouring.

The cartridge may include an air permeable shell in which the vaporisable substance is located in use. The air permeable material may be a material which is electrically insulating and non-magnetic. The material may have a high air permeability to allow air to flow through the material with a resistance to high temperatures. Examples of suitable air permeable materials include cellulose fibres, paper, cotton and silk. The air permeable material may also act as a filter. Alternatively, the body may be a vaporisable substance wrapped in paper. Alternatively, the body may be a vaporisable substance held inside a material that is not air permeable, but which comprises appropriate perforation or openings to allow air flow. Alternatively, the body may be the vaporisable substance itself. The body may be formed substantially in the shape of a stick.

According to a third aspect of the present invention, there is provided an induction heatable cartridge for use with an induction heating assembly according to the first aspect of the present invention, the cartridge comprising: a solid vaporisable substance; and an induction heatable susceptor held by the vaporisable substance, the susceptor comprising one or more susceptor plates arranged, where there is more than one susceptor plate, in substantially parallel planes and being ring shaped so as to provide apertures at least one of which radially surrounds a temperature monitoring region and is located axially between the centre of the cartridge and the temperature monitoring region, whereby a temperature sensor may project into the temperature monitoring region without passing substantially through the aperture of any of the susceptor plates when the cartridge is fitted into the heating compartment of an induction heating assembly.

Preferably an induction heatable cartridge according to the third aspect of the present invention may further comprise a deformable portion adjacent the temperature monitoring region for permitting a temperature sensor to project into the temperature monitoring region when fitted into the heating compartment of an induction heating assembly, also preferably the deformable portion adjacent the temperature monitoring region is arranged in use to deform around a temperature sensor when fitted into the heating compartment of an induction heating assembly thereby permitting a temperature sensor to project into the temperature monitoring region. By providing a deformable portion, the surface of the cartridge (which may for example be a fibrous paper like material) remains intact and prevents spillage of the vaporizable material (e.g. tobacco material) after the cartridge has been used. Additionally, it can prevent a temperature sensor from projecting too far into the cartridge and hence getting close to the very strong magnetic fields which occur at the centre of the induction coil of the heating apparatus (which is typically arranged to be coincident with the centre of the cartridge in order to maximise the heating of the cartridge).

It should be noted that if using a cartridge having a deformable outer portion, rather than a frangible outer portion, then typically a slightly larger aperture is required in the susceptor adjacent to the temperature-monitoring region (compared to the case where the cartridge has a frangible portion-see below), in order to permit the vaporizable material (which is preferably solid but deformable tobacco material—e.g. strands of tobacco) contained within the cartridge to be compressed sufficiently to allow a temperature sensor to project into the temperature monitoring region. (Note, where a frangible portion is provided the temperature sensor can be provided with a (sharp) pointed end which displaces just a small amount of the tobacco material when entering the cartridge such that only a relatively small aperture is required in the susceptor discs). However, it is preferred if there is a gap between the inner edge of a susceptor and the temperature sensor when inserted into the cartridge so that the temperature sensor monitors the temperature of the vaporizable material rather than directly monitoring the temperature of the inner edge of a susceptor. Such a gap is preferably of the order of between 5% and 20% of the outer diameter of the cartridge.

According to a fourth aspect of the invention, there is provided a vapour generating device comprising: an induction heating assembly according to the first aspect; an induction heatable cartridge according to the second or third aspect located within the heating compartment of the induction heating assembly; an air inlet arranged to provide air to the heating compartment; and an air outlet in communication with the heating compartment.

The cartridge may be arranged in the heating compartment in any suitable manner. Typically, the cartridge comprises a susceptor with an aperture in a central region of the cartridge, the susceptor being orientated and the aperture being sized and located such that the temperature sensor is located within the aperture. This allows the susceptor to couple with the EM field generated in use by the induction coil of the induction heating assembly whilst minimising the EM field interacting with the temperature sensor of the induction heating assembly and generating noise in the signal produced by the temperature sensor.

Preferably, an outer portion of a susceptor of the cartridge may be closer to an induction coil of the induction heating assembly than a temperature sensor of the induction heating assembly is to the induction coil. This further reduces noise in the signal produced by the temperature sensor due to the susceptor absorbing energy from the EM field instead of the energy being absorbed by the temperature sensor.

Preferably, a temperature sensor of the induction heating assembly is positioned between an axial centre of an induction coil of the induction heating assembly and an axial end of the induction coil, a part of the induction heatable cartridge being located in use at the axial centre of the induction coil. This has the same advantages as set out above in relation to the first aspect.

BRIEF DESCRIPTION OF FIGURES

An example of an induction heating assembly and an example of an induction heatable cartridge are described in detail below, with reference to the accompanying figures, in which.

DETAILED DESCRIPTION

We now describe an example of a vapour generating device, including a description of an example induction heating assembly, example induction heatable cartridges and example susceptors.

Figure 1:
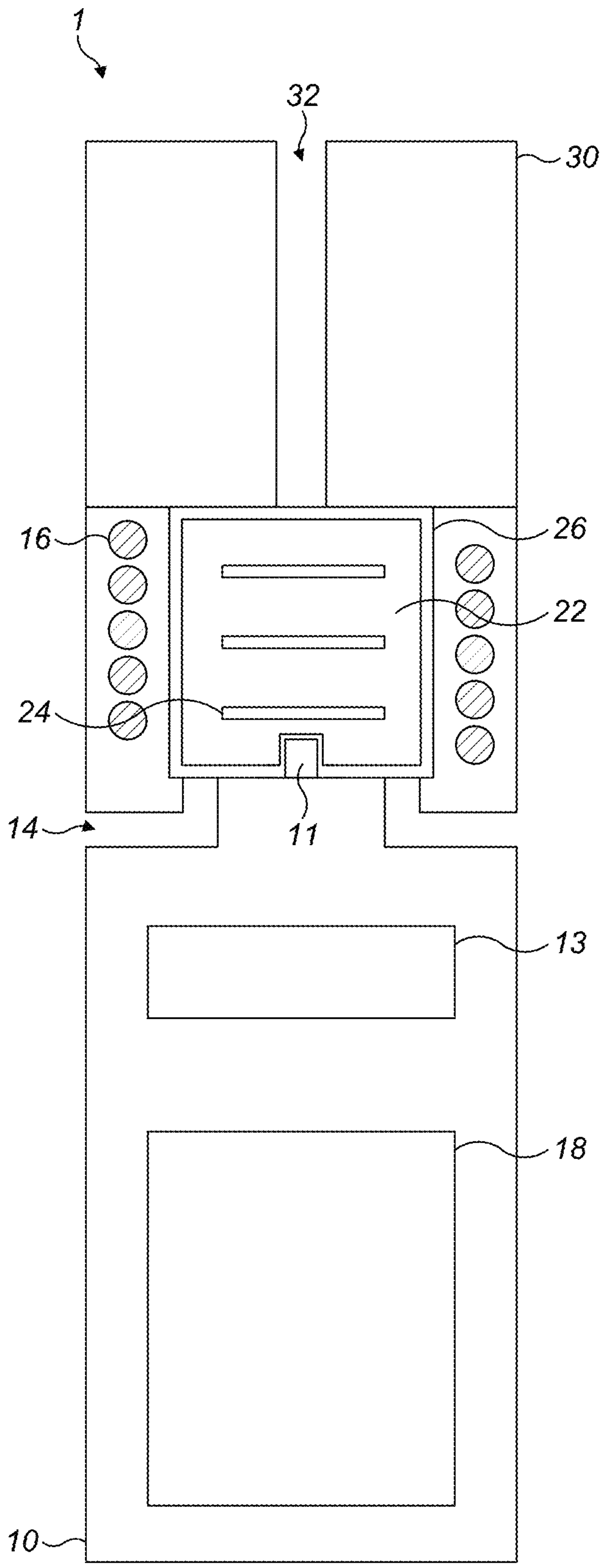
FIG. 1 shows a schematic view of an example vapour generating device.
Figure 2:
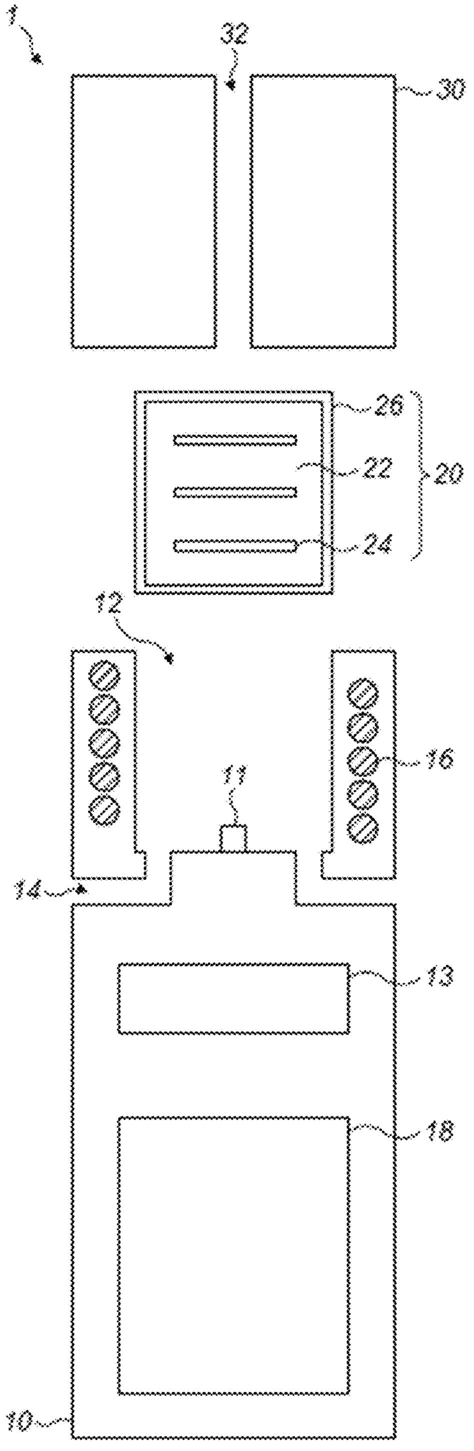
FIG. 2 shows an exploded view of the vapour generating device according to the example shown in FIG. 1.

Referring now to FIG. 1 and FIG. 2, an example vapour generating device is generally illustrated at 1 in an assembled configuration in FIG. 1 and an unassembled configuration in FIG. 2.

The example vapour generating device 1 is a hand held device (by which we intend to mean a device that a user is able to hold and support un-aided in a single hand), which has an induction heating assembly 10, an induction heatable cartridge 20 and a mouthpiece 30. Vapour is released by the cartridge when it is heated. Accordingly, vapour is generated by using the induction heating assembly to heat the induction heatable cartridge. The vapour is then able to be inhaled by a user at the mouthpiece.

In this example, a user inhales the vapour by drawing air into the device 1 from the surrounding environment, through or around the induction heatable cartridge 20 and out of the mouthpiece 30 when the cartridge is heated. This is achieved by the cartridge being located in a heating compartment 12 defined by a portion of the induction heating assembly 10, and the compartment being in gaseous connection with an air inlet 14 formed in the assembly and an air outlet 32 in the mouthpiece when the device is assembled. This allows air to be drawn through the device by application of negative pressure, which is usually created by a user drawing air from the air outlet.

Figure 2A:
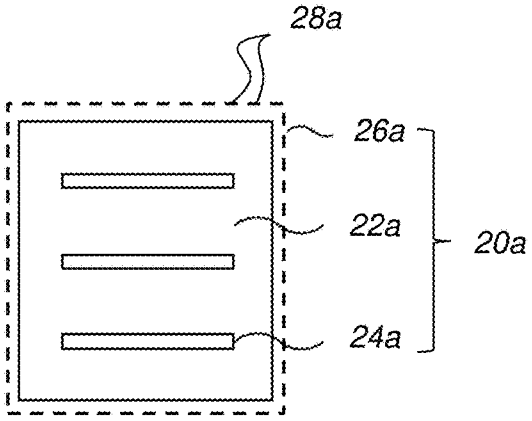
FIG. 2A shows a schematic view of an example induction heatable cartridge.

The cartridge 20 is a body which includes a vaporisable substance 22 and an induction heatable susceptor 24. In this example the vaporisable substance includes one or more of tobacco, humectant, glycerine and propylene glycol. The vaporisable substance is also solid (note that liquid components such as propylene glycol and glycerine may be absorbed by an absorbent solid material such as tobacco). The susceptor includes a plurality of plates that are electrically conducting. In this example, the cartridge also has a layer or membrane 26 to contain the vaporisable substance and susceptor, with the layer or membrane being air permeable. In other examples, the membrane is not present. Alternatively, as shown in FIG. 2A, a cartridge 20*a* may be a vaporisable substance 22*a* and an induction heatable susceptor 24*a* held inside a material 26*a* that is not air permeable, but which comprises appropriate perforation or openings 28*a* to allow air flow.

As noted above, the induction heating assembly 10 is used to heat the cartridge 20. The assembly includes an induction heating device, in the form of an induction coil 16 and a power source 18. The power source and the induction coil are electrically connected such that electrical power may be selectively transmitted between the two components.

In this example, the induction coil 16 is substantially cylindrical such that the form of the induction heating assembly 10 is also substantially cylindrical. The heating compartment 12 is defined radially inward of the induction coil with a base at an axial end of the induction coil and side walls around a radially inner side of the induction coil. The heating compartment is open at an opposing axial end of the induction coil to the base. When the vapour generating device 1 is assembled, the opening is covered by the mouthpiece 30 with an opening to the air outlet 32 being located at the opening of the heating compartment. In the example shown in the figures, the air inlet 14 has an opening into the heating compartment at the base of the heating compartment.

A temperature sensor 11 is located at the base of the heating compartment 12. Accordingly, the temperature sensor is located within the heating compartment at the same axial end of the induction coil 16 as the base of the heating compartment. This means that when a cartridge 20 is located in the heating compartment and when the vapour generating device 1 is assembled (in other words when the vapour generating device is in use or ready for use) the cartridge is deformed around temperature sensor. This is because, in this example, the temperature sensor does not pierce the membrane 26 of the cartridge due to its size and shape.

Figure 3:
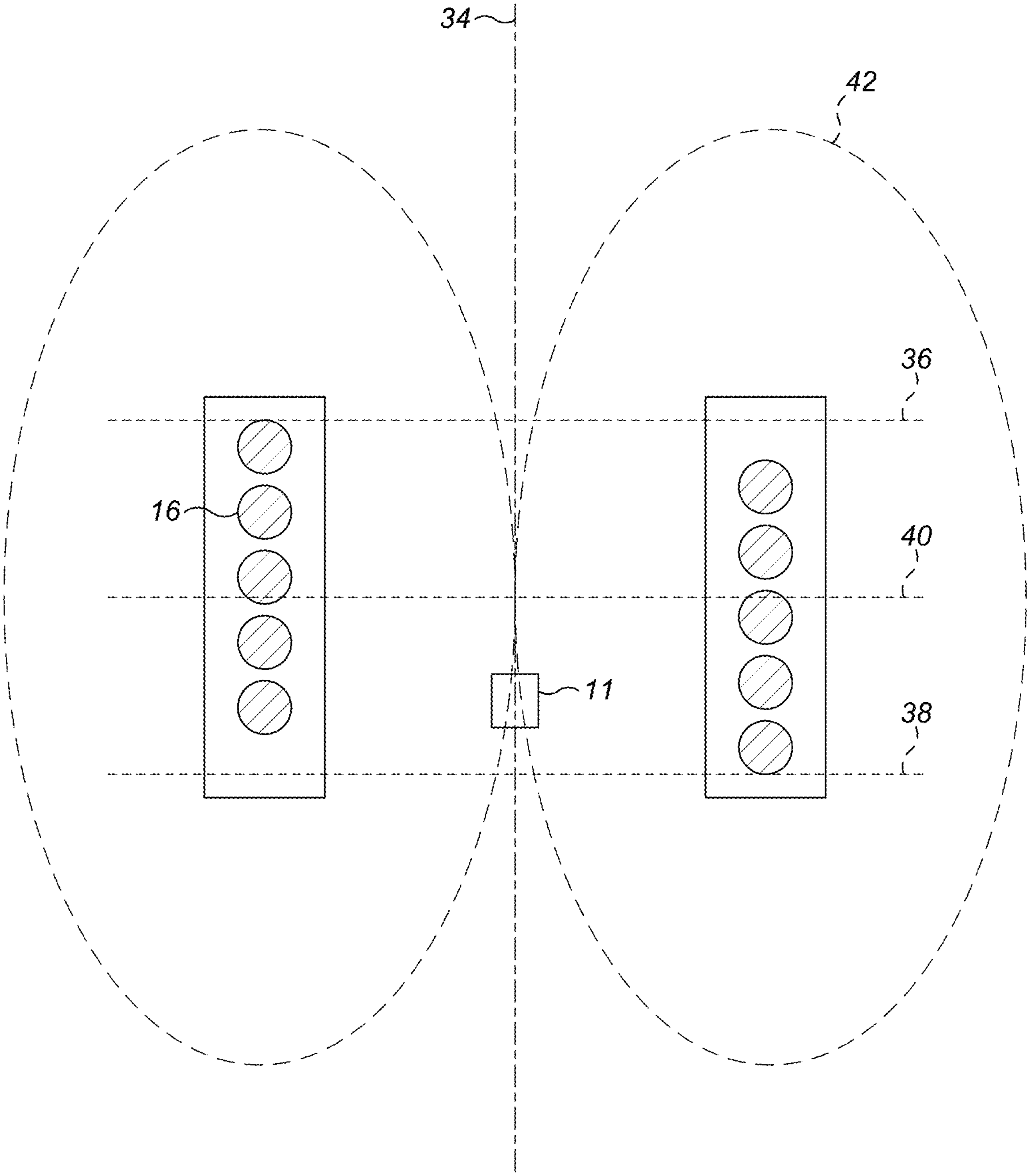
FIG. 3 shows a schematic view of an example induction coil and temperature sensor.

The temperature sensor 11 is also located on the central longitudinal axis 34 of the induction coil 16. As shown in FIG. 3, the induction coil has axial ends 36, 38. These are the extreme ends of the coil. The induction coil also has an axial centre 40. This is located half way between the axial ends of the induction coil. The central longitudinal axis intersects planes across each of the axial ends and axial centre of the induction coil. In FIG. 3 the temperature sensor is shown located only between one axial end and the axial centre. This is permissible in some examples. FIG. 3 also shows example EM field lines 42 of the EM field producible by the induction coil. These are generally oval in shape having their widest point at about the axial centre of the coil. Due to the position of the temperature sensor relative to the EM field, this allows any interaction with the EM field to be weaker the further from the axial centre the temperature sensor is located.

Figure 4:
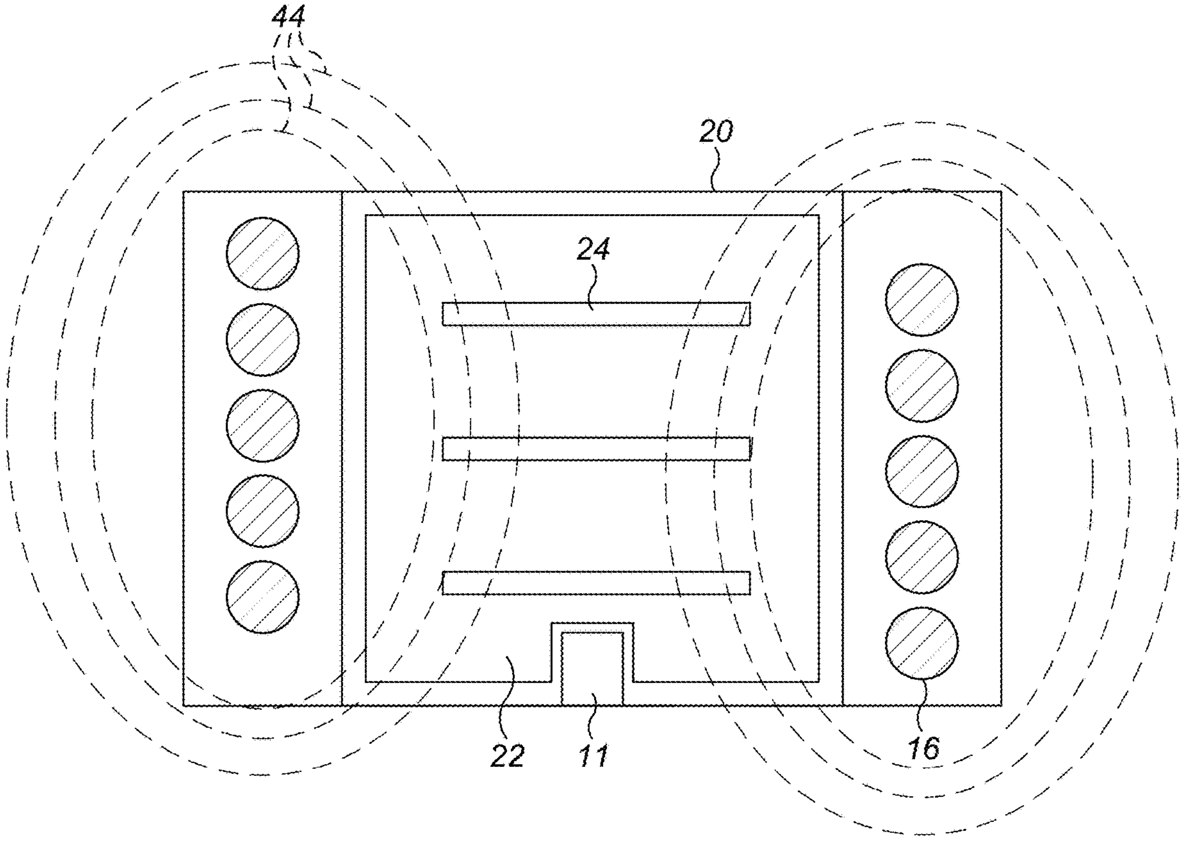
FIG. 4 shows a schematic view of an example induction heatable cartridge, induction coil and temperature sensor.

FIG. 4 shows an enlarged view of how the induction coil 16, cartridge 20 and temperature sensor 11 are arranged relative to each other when the device is assembled. FIG. 4 also shows example EM field lines 44 of the EM field producible by the induction coil. In this example, there are three susceptor plates with each located in a parallel plane, with each plane being perpendicular to the central longitudinal axis of the induction coil. The susceptor plates are located in the middle of the cartridge, and therefore their mid-points are aligned along the central longitudinal axis of the induction coil. The susceptor plates themselves are orientated so they are perpendicular to the central longitudinal axis of the induction coil.

The susceptor plates 24 are wider than the temperature sensor 11. This means that portions of each susceptor plates are closer to the induction coil 16 than the temperature sensor. This causes the susceptor plates to interact more with the EM field when it is generated than the temperature sensor interacts with the EM field.

Returning to FIGS. 1 and 2, the temperature sensor 11 is electrically connected to a controller 13 located within the induction heating assembly 10. The controller is also electrically connected to the induction coil 16 and the power source 18, and is adapted in use to control operation of the induction coil and the temperature sensor by determining when each is to be supplied with power from the power source.

As mentioned above, in order for vapour to be produced, the cartridge 20 is heated. This is achieved by an electrical current being supplied by the power source 18 to the induction coil 16. The current flows through the induction coil causing a controlled EM field to be generated in a region near the coil. The EM field generated provides a source for an external susceptor (in this case the susceptor plates of the cartridge) to absorb the EM energy and convert it to heat, thereby achieving induction heating.

In more detail, by power being provided to the induction coil 16 a current is caused to pass through the induction coil, causing an EM field to be generated. The current supplied to the induction coil is an alternating (AC) current. This causes heat to be generated within the cartridge because, when the cartridge is located in the heating compartment 12, it is intended that the susceptor plates are arranged (substantially) parallel to the radius of the induction coil 16 as is shown in the figures, or at least have a length component parallel to the radius of the induction coil. Accordingly, when the AC current is supplied to the induction coil while the cartridge is located in the heating compartment, the positioning of the susceptor plates causes eddy currents to be induced in each plate due to coupling of the EM field generated by the induction coil to each susceptor plate. This causes heat to be generated in each plate by induction.

The plates of the cartridge 20 are in thermal communication with the vaporisable substance 22, in this example by direct or indirect contact between each susceptor plate and the vaporisable substance. This means that when the susceptor 24 is inductively heated by the induction coil 16 of the induction heating assembly 10, heat is transferred from the susceptor 24 to the vaporisable substance 22, to heat the vaporisable substance 22 and produce a vapour.

When the temperature sensor 11 is in use, it monitors the temperature by measuring temperature at its surface. Each temperature measurement is sent to the controller 13 in the form of an electrical signal.

Figure 5A:
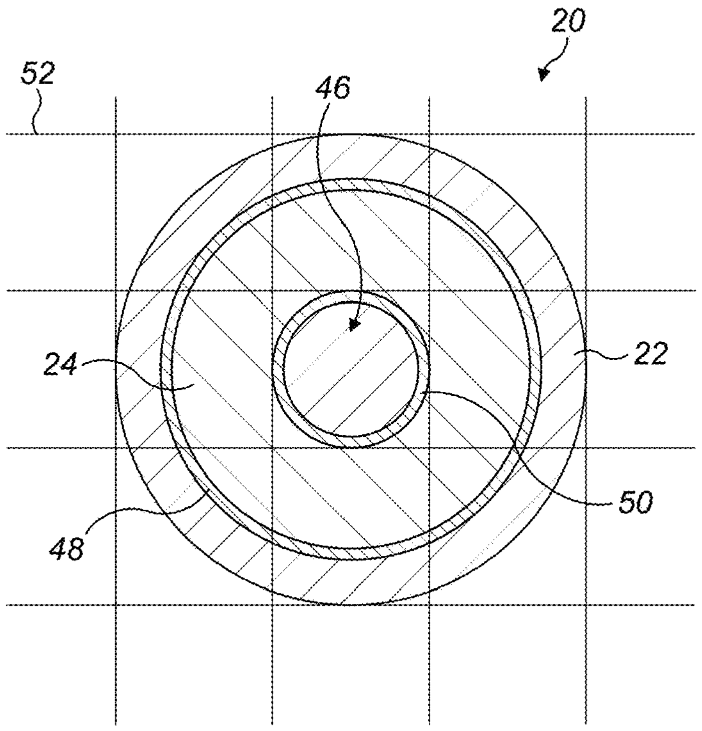
FIGS. 5A and 5B show cross-sectional plan views of example induction heatable cartridges.
Figure 5B:
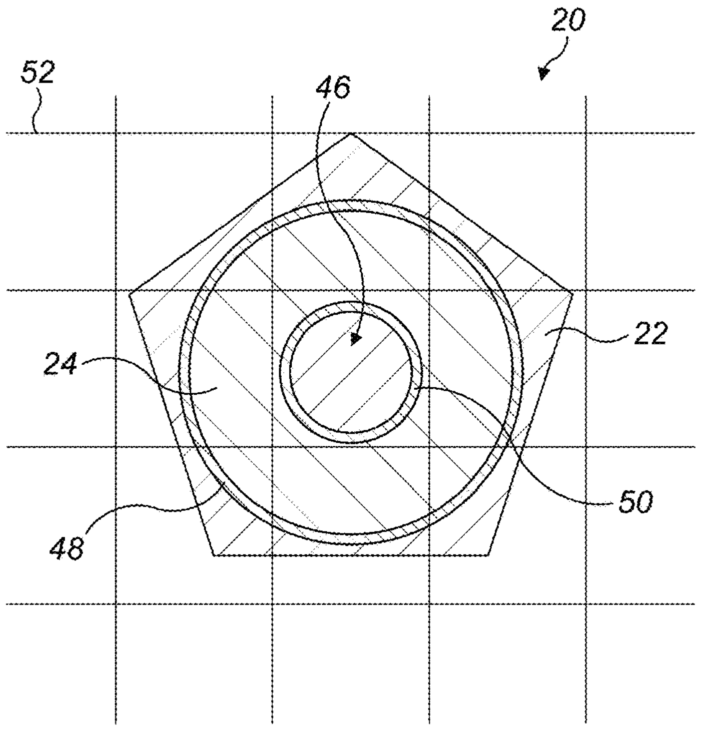

The cartridge 20 has a number of possible configurations. Some example configurations are shown in the remaining figures. Referring now to FIGS. 5A and 5B, these show two example cartridges.

FIG. 5A shows a cartridge 20 that has a circular cross-section perpendicular to its length. The cartridge has vaporisable material 22 that surrounds a circular susceptor plate 24. FIG. 5A shows one circular susceptor plate of the cartridge. The mid-point of the susceptor plate is aligned with the mid-point of the cartridge. The susceptor plate has a circular aperture 46 at its centre. This means that as well as having an outwardly facing edge 48 around the circumference (i.e. outer perimeter) of the susceptor plate, the susceptor plate also has an inwardly facing edge 50 around the perimeter of the aperture.

A grid 52 is shown in FIG. 5A (and in FIG. 5B). The grid consists of nine equally sized squares arranged in a three by three array. The array is sized so that the outer sides of the array form tangents to the outside edge of the cartridge 20 shown in FIG. 5A. The sides of the square in the middle of the array (i.e. in the middle square in the middle row and middle column) also form tangents to the perimeter of the aperture 46 in the susceptor plate 24. This central region therefore includes the inwardly facing edge 50 of the susceptor plate. The length of inwardly facing edge in this region is greater than the length of outwardly facing edge in any of the outer regions provided by the other eight squares of the array. This means that when the susceptor plate is coupled to an EM field, most heat will be generated in the central region.

FIG. 5B shows a similar cartridge 20 to the cartridge shown in FIG. 5A. The only difference is that the cartridge has a pentagonal cross-section instead of a circular cross-section. In this example, the grid 52 is still the same size and shape as the grid shown in FIG. 5A. As such, the sides of the grid form tangents to a circle (not shown) joining the vertices of the pentagon.

Figure 6A:
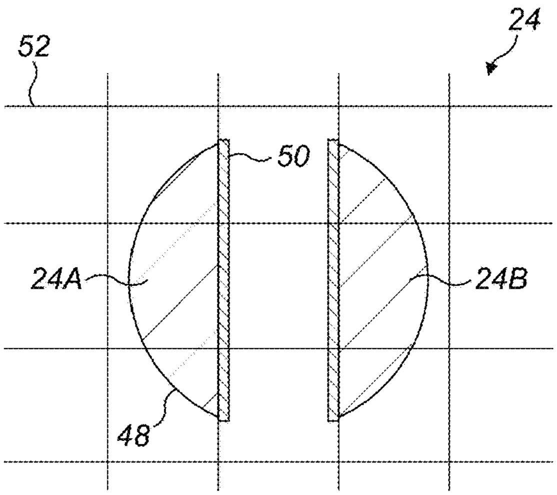
FIGS. 6A, 6B and 6C show a schematic view of example susceptor plates.
Figure 6B:
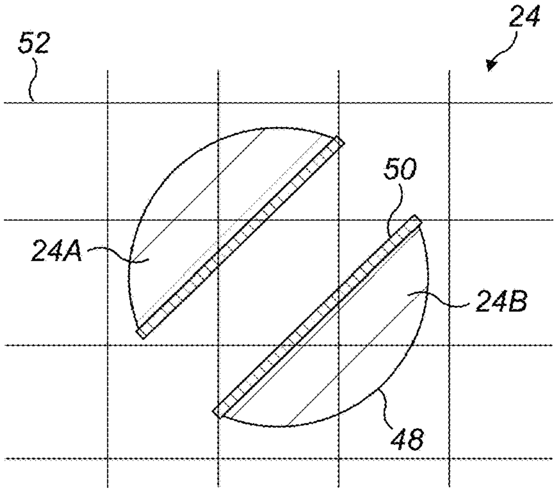
Figure 6C:
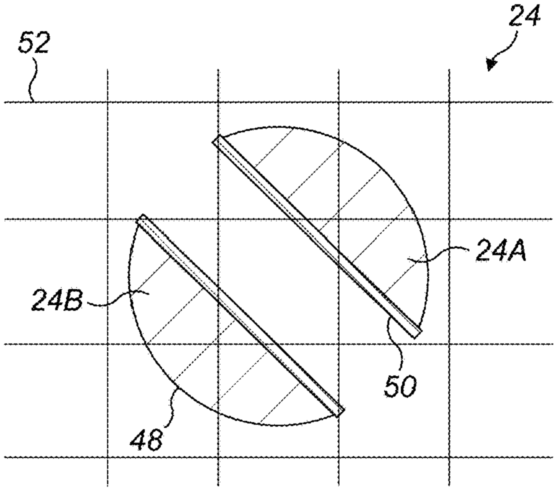

FIGS. 6A, 6B and 6C show an example configuration of the susceptor plates 24. As mentioned above, the susceptor plates are arranged in three planes. FIGS. 6A, 6B and 6C each show one of these planes. Each susceptor plate has two portions 24A, 24B. The portions are identically shaped segments of a circle. The portions are separated, and the gap between the portions is in the region in which the rest of the circle of which the portions are segments would be located if present. The portions each have an outwardly facing edge, which is the curved edge that provides an arc from a circumference of a circle. Each portion also has an inwardly facing edge. The inwardly facing edges are straight and make up the remainder of the perimeter of each portion.

FIGS. 6A to 6C show the same grid as FIGS. 5A and 5B. On this grid, the inwardly facing edges of the portions 24A, 24B of the susceptor plate 24 are separated by the width of one square. In FIG. 6A, this means that the inwardly facing edges of the portions are located on opposing sides of the middle column of the three by three array. Accordingly, the middle square of the array has the greatest length of inwardly facing edge in it, and that length is greater than the length of outwardly facing edge in any directly comparable outer region.

FIGS. 6B and 6C show identical susceptor plates 24 to the susceptor plate shown in FIG. 6A. The only difference is that the plate has been rotated about the mid-point of the respective susceptor plate relative to the orientation of the susceptor plate shown in FIG. 6A. The susceptor plate shown in FIG. 6B has been rotated about 45 degrees (°) clockwise, and the susceptor plate shown in FIG. 6C has been rotated about 135° clockwise from the orientation of the susceptor plate shown in FIG. 6A. The grid is not rotated, but the middle square retains a greater length of inwardly facing edge than any other square and also a greater length of inwardly facing edge than the total length of outwardly facing edge contained in any square.

Figure 7:
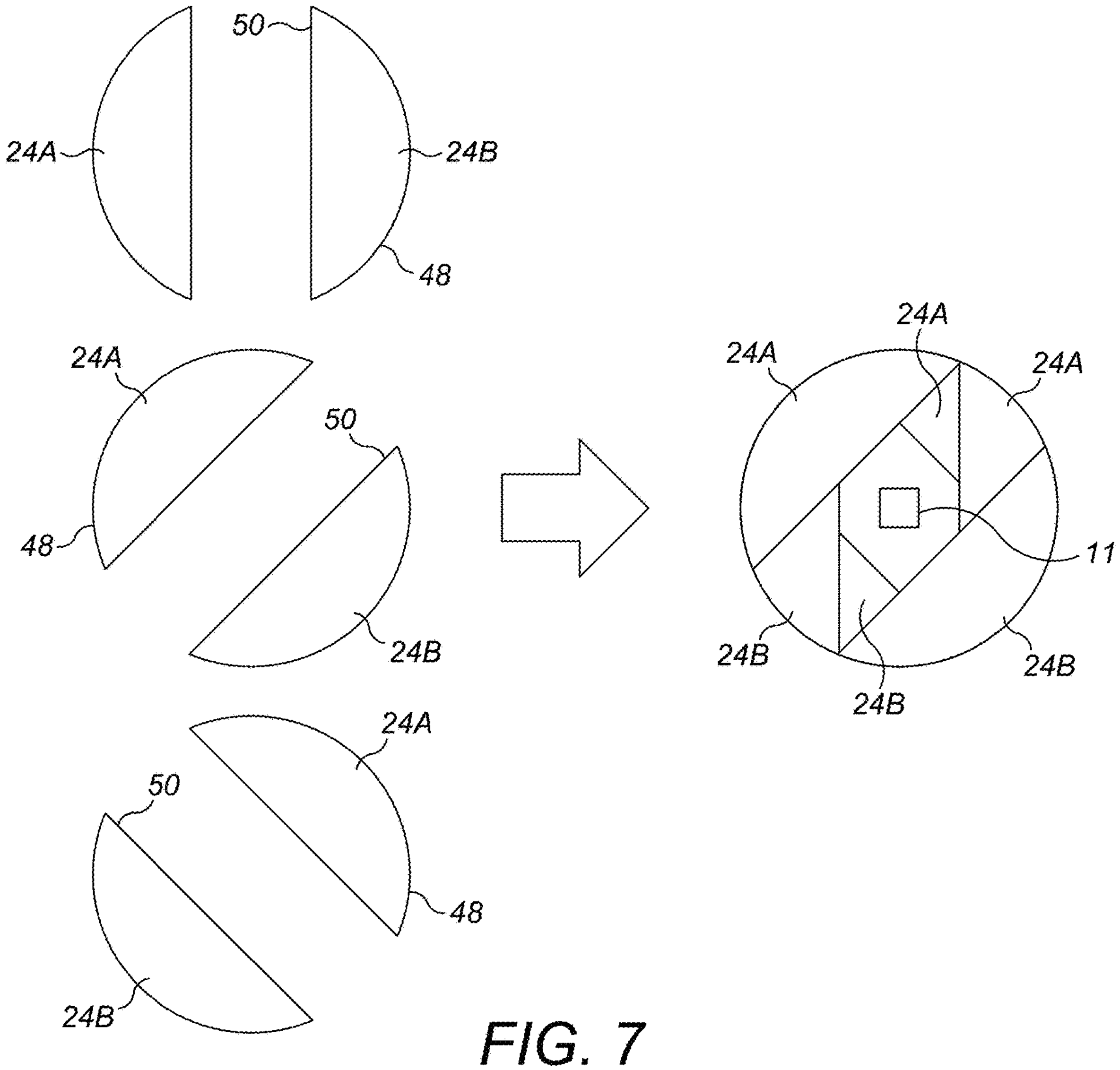
FIG. 7 shows an example arrangement of example susceptor plates.

As set out above FIGS. 6A to 6C show susceptor plates 24 that are located in parallel planes spread along the central longitudinal axis of the induction coil 11 when the cartridge is assembled. FIG. 7 shows the susceptor plates in the configuration shown in FIGS. 6A to 6C separated as in FIGS. 6A to 6C and a plan view of those susceptor plates positioned as they are in a cartridge when they are ready to use. When assembled, the susceptor plates of this arrangement encircle the temperature sensor 11 when the cartridge is located in the heating compartment. Accordingly, an aperture is provided through the susceptor plates maintaining a lateral separation between the susceptor plates and the temperature sensor while providing a susceptor around a full circle over different levels.

Figure 8:
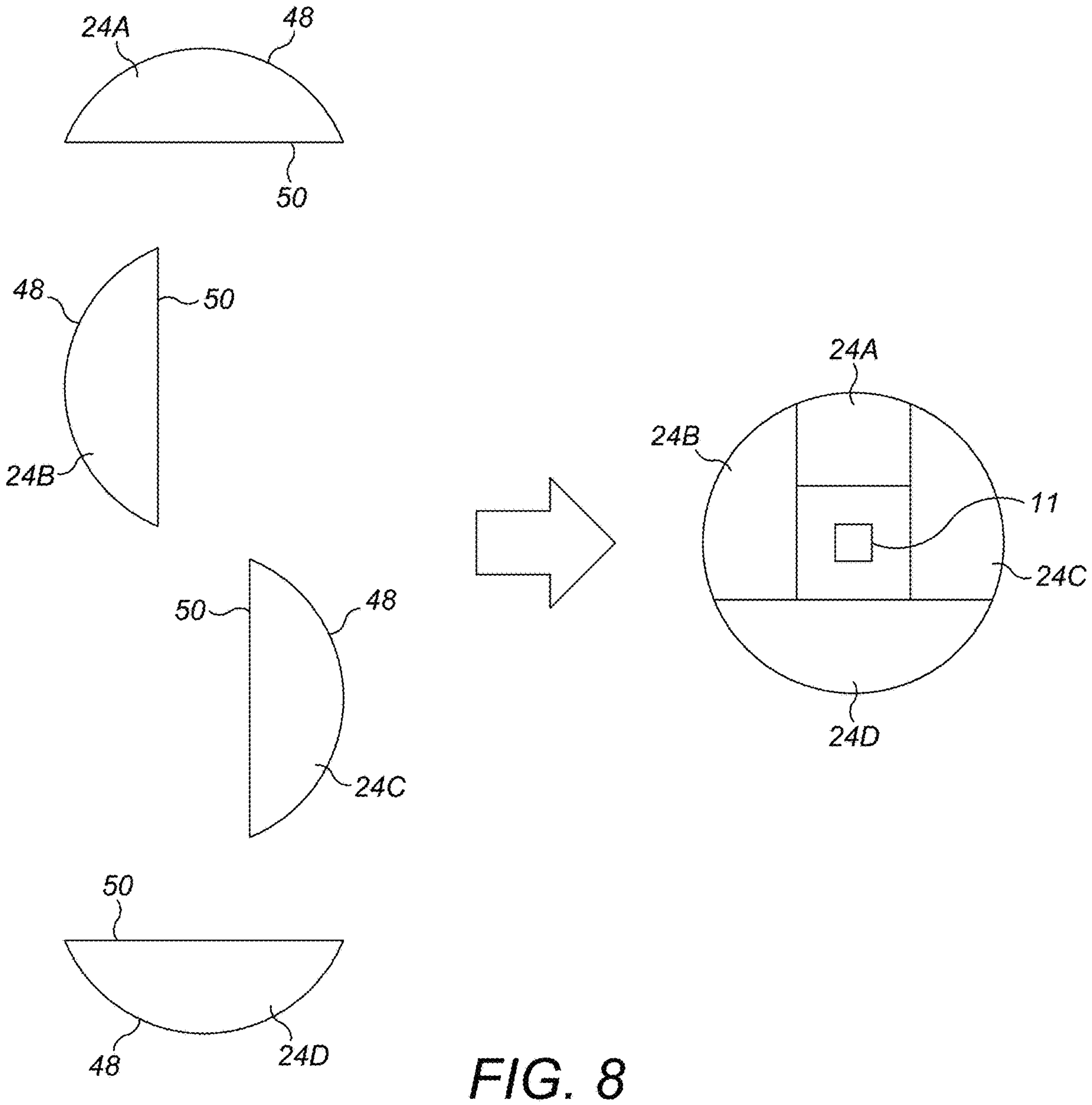
FIG. 8 shows a further example arrangement of example susceptor plates.

A further configuration that achieves this is shown in FIG. 8. FIG. 8 shows four portions 24A, 24B, 24C, 24D of a susceptor 24. As with the portions of susceptor plate shown in FIGS. 6A to 6C and FIG. 7, each portion shown in FIG. 8 is shaped as a segment of a circle of similar shape, size and proportions as the susceptor plate portions described above. The portions of the susceptor shown in FIG. 8 are again spread over three parallel planes when located in a cartridge. The top and bottom planes have a single portion in them, and the middle plane has two portions. The susceptor portions in the plane with two portions therein are arranged and orientated in the same way as the susceptor portions of FIG. 6A. The susceptor portions in other two planes are arranged relative to each other in the same arrangement as the portions in a single plane. These portions are rotated through 90° about the mid-point of the susceptor plates as described above. When assembled, this provides a square aperture in the centre of the susceptor and a complete circle around the outside of the susceptor when viewed from above or below. The temperature sensor 11 is again located (radially) in the aperture.

The invention claimed is:

1. An induction heating assembly for a vapour generating device, the heating assembly comprising:

an induction coil, radially inward of which a heating compartment is defined for receiving, in use, a body comprising a vaporisable substance and a susceptor; and a temperature sensor located at an end of the heating compartment on a central longitudinal axis of the induction coil, wherein the induction coil is arranged to heat, in use, the susceptor, and the temperature sensor is arranged to monitor, in use, a temperature related to heat generated from the susceptor, and wherein the temperature sensor is positioned at an axial end of the induction coil or at any point removed from the axial end of the induction coil by up to a distance of a quarter of a length of the induction coil either towards an axial centre of the induction coil or away from the axial centre of the induction coil.

2. The heating assembly according to claim 1, wherein the induction coil has a cylindrical shape.

3. The heating assembly according to claim 1, wherein the temperature sensor is positioned between the axial centre of the induction coil and the axial end of the induction coil.

4. The heating assembly according to claim 1, wherein the temperature sensor is sized and positioned in use so as not to extend closer to the axial centre of the induction coil than a point midway between the axial centre of the induction coil and the axial end of the induction coil proximate to the temperature sensor.

5. The heating assembly according to claim 4, wherein the axial end of the induction coil is a closest axial end to the end of the heating compartment at which the temperature sensor is located.

6. The heating assembly according to claim 1, wherein a cross sectional area of the temperature sensor perpendicular to the central longitudinal axis of the coil is less than 10.0 square $mm^2$.

7. The heating assembly according to claim 1, further comprising a controller located within the induction heating assembly that is electrically connected to the temperature sensor, the induction coil, and a power source.

8. A vapour generating device comprising:

an induction heating assembly comprising:

an induction coil, radially inward of which a heating compartment is defined; and a temperature sensor located at an end of the heating compartment on a central longitudinal axis of the induction coil, an induction heatable cartridge at least partially located within the heating compartment of the induction heating assembly, the cartridge comprising:

a solid vaporisable substance;

a susceptor plate held by the vaporisable substance; and a deformable outer portion adjacent an edge of the susceptor plate, wherein the susceptor plate is wider than the temperature sensor, wherein the induction coil is arranged to heat, in use, the susceptor plate, and the temperature sensor is arranged to monitor, in use, a temperature related to heat generated from the susceptor plate.

9. The vapour generating device according to claim 8, wherein the deformable outer portion of the cartridge is located at a surface of the cartridge made of a fibrous material.

10. The vapour generating device according to claim 8, wherein the susceptor plate of the cartridge comprises one or more of aluminium, iron, nickel, stainless steel and alloys thereof.

11. The vapour generating device according to claim 8, wherein the susceptor plate of the cartridge comprises nickel chromium.

12. The vapour generating device according to claim 8, wherein the susceptor plate of the cartridge has a length component parallel to a radius of the induction coil.

13. The vapour generating device according to claim 8, wherein the vaporisable substance of the cartridge is disposed inside a material that is not air permeable, but which comprises perforations or openings to allow air flow.

14. The vapour generating device according to claim 8, wherein the vaporisable substance of the cartridge is substantially in the shape of a stick.

15. The vapour generating device according to claim 8, wherein the vaporisable substance of the cartridge includes tobacco, humectant, glycerine and/or propylene glycol.

16. The vapour generating device according to claim 8, wherein the induction heating assembly further comprises:

an air inlet arranged to provide air to the heating compartment; and an air outlet in communication with the heating compartment.

17. The vapour generating device according to claim 8, wherein an outer portion of the susceptor plate of the cartridge is closer to the induction coil of the induction heating assembly than the temperature sensor of the induction heating assembly is to the induction coil.

* * * * *